Patented Aug. 28, 1951

2,566,230

UNITED STATES PATENT OFFICE 2,566,230

PREPARATION OF MELAMINE

Johnstone S. Mackay, Greenwich, and Joseph H. Paden, Glenbrook, Conn., assignors to American Cyanamid Company, New York, N. Y., a corporation of Maine No Drawing. Application October 29, 1943, Serial No. 508,246

5 Claims. (Cl. 260—249.7)

This invention relates to the preparation of melamine.

The compound commonly known as melamine is a white crystalline solid having a melting point of about 354° C. It has the empirical formula, $C_3N_6H_6$, and is generally believed to have the following structural formula:

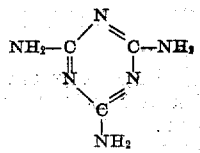

As such, it is frequently called 2,4,6-triamino-1,3,5-triazine. Some of its reactions suggest that it may also exist in whole or in part in one or more isomeric forms such as:

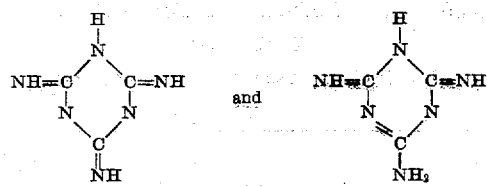

Absolute proof of the exact structure of melamine, or its supposed isomers, has not been definitely established but the term melamine is commonly recognized, and is used herein by us, as including 2,4,6-triamino-2,3,5-triazine and its several isomers.

Although melamine has been known for many years, the only commercially feasible methods for its production have utilized cyanamide or dicyandiamide as starting materials. These latter compounds yield melamine in fair to good yields by polymerization upon heating, either alone or with several different types and kinds of solvents, diluents, catalysts, etc. A few other organic nitrogen compounds, for example, guanidine salts, have been said to yield small percentages of melamine along with various other compounds when heated at temperatures up to about 200° C.

We have now found that melamine can be prepared by heating hydroxytriazines in the presence of ammonia at temperatures of 300° C., or higher. The hydroxytriazines, cyanuric acid, ammelide, and ammeline are heterocylic compounds having the triazine structure:

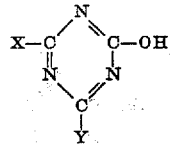

in which X and Y are one or both of either —$NH_2$ or —OH.

When cyanuric acid is employed as the hydroxytriazine the equation for its conversion to melamine may be written, empirically, as follows:

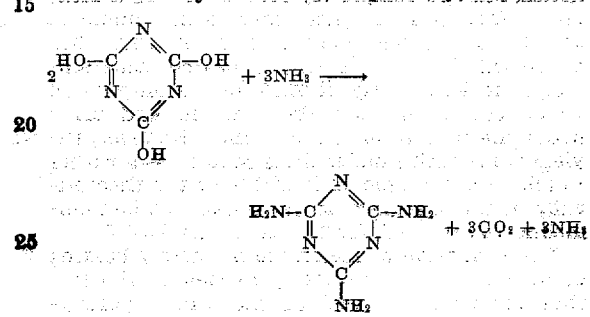

The formation of melamine from cyanuric acid and ammonia probably takes place through a series of intermediate reactions rather than by direct conversion as shown. It is probable that the ammonia reacts with the hydroxy groups of the cyanuric acid which reaction results in the formation of water and replacement of the hydroxy groups with —$NH_2$ groups. The water, however, tends to hydrolyze the melamine or unreacted cyanuric acid, or both, or possibly other intermediate reaction products with the ultimate formation of carbon dioxide and ammonia as illustrated. Accordingly, while the above equation calls for the use of three molecular equivalents of ammonia with two molecular equivalents of cyanuric acid it is not necessary that this much ammonia be employed. Because ammonia exerts a stabilizing influence on melamine and as it further tends to favor the reaction an excess thereof greatly in excess of the theoretical amounts required will do no harm and is actually beneficial in most cases.

When ammelide is employed as the hydroxytriazine the equation may be written as follows:

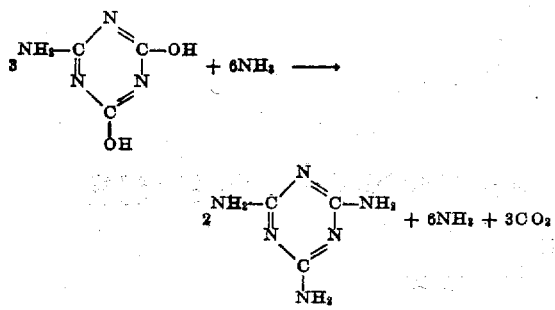

This reaction also results in the ultimate formation of ammonia and carbon dioxide, probably through the same mechanism as described above.

The formation of melamine from ammeline and ammonia may be illustrated by the following equation:

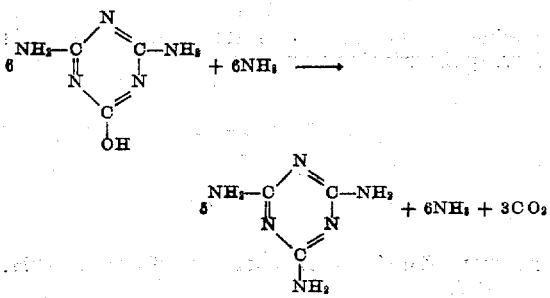

As will be seen, the ammonia employed in the reaction may be completely recovered. As a matter of fact, it is not necessary to use ammonia at all to produce melamine from ammeline. When this latter substance is heated some ammonia is apparently formed by decomposition which can then start the reaction and bring about the formation of melamine. However, the yield of melamine under these conditions is rather small. For example, only 18.1% of the theoretical amount of melamine was obtained when ammeline was heated for two hours at 350° C.

The formation of melamine by merely heating ammeline is most surprising in view of the fact that ammeline, as well as the other hydroxytriazines, is comparatively heat stable. Apparently small amounts of water present in the reaction zone cause partial hydrolysis of the hydroxytriazine with resultant formation of ammonia which then causes the ultimate formation of melamine as illustrated by the equation above. This is further verified by the fact that when cyanuric acid, or ammelide, and a small amount of water are heated together to a temperature of 300° C., or higher, in a closed vessel melamine is formed.

When a hydroxytriazine is heated in a closed vessel at 300° C. in the presence of ammonia melamine is formed but at a rather slow rate. In a series of experimental runs, 40 g. of hydroxytriazine and 25 g. of anhydrous ammonia were placed in an autoclave having an internal capacity of 300 cc. The autoclave was then closed and heated to a temperature of 300° C. and held at this temperature for two hours. It was then cooled in cold running water, opened and the contents thereof analyzed. The results of three such experimental runs in which the hydroxytriazines, cyanuric acid, ammelide and ammeline were used are shown in the following table.

TABLE I 40 g. hydroxytriazine+25 g. ammonia

[2 hrs. at 300° C.]

| Hydroxytriazine | Melamine Formation, Per Cent of Theoretical |
|---|---|
| Cyanuric Acid | 22.2 |
| Ammelide | 5.7 |
| Do | 9.3 |

At higher temperatures the formation of melamine takes place much more rapidly and in higher yields. A series of experimental runs similar to that just described was made at a temperature of 350° C. The results are shown in the following table.

TABLE II 40 g. hydroxytriazine+25 g. ammonia

[2 hrs. at 350° C.]

| Hydroxytriazine | Melamine Formation, Per Cent of Theoretical |
|---|---|
| Cyanuric Acid | 70.6 |
| Ammelide | 85.6 |
| Do | 83.8 |

By comparing the results shown in Table II with those of Table I it will be apparent that higher temperatures very greatly favor the formation of melamine.

At still higher temperatures equally good yields of melamine are obtained in a much shorter period of time. For example, when cyanuric acid, ammelide and ammeline were each heated with ammonia at 400° C. for 15 minutes in an autoclave, the following results were obtained.

TABLE III 40 g. hydroxytriazine+25 g. ammonia

[15 minutes at 400° C.]

| Hydroxytriazine | Melamine Formation, Per Cent of Theoretical |
|---|---|
| Cyanuric Acid | 94.4 |
| Ammelide | 80.3 |
| Do | 38.5 |

As will be apparent from the results of Table III excellent yields of melamine are obtained at 400° C. This is most surprising since it is well known that melamine starts to decompose when heated at temperatures of about 350° C. However, the presence of ammonia in the system, which is known to have a stabilizing influence on melamine, and the short heating period necessary to produce melamine at these high temperatures probably account for the fact that high yields of melamine can be obtained at temperatures above its decomposition temperature. As a matter of fact even higher yields of melamine can be obtained in a shorter period of time at temperatures in excess of 400° C. Accordingly, we may use temperatures as high as 500° C., or higher, provided that the heating period is not extended beyond a reasonable period of time. At present, we prefer temperatures within the range 350° C. to 450° C.

In the course of our numerous experiments in converting hydroxytriazines to melamine, we have observed that when the conversion is carried out at temperatures above 350° C. and when a portion of the reaction zone is at a temperature of less than 350° C., as for example when the upper end of the autoclave is unheated, the melamine formed during the reaction is, to a considerable extent, sublimed and condensed on the cooler portions of the autoclave in the form of fine needle-like crystals having a substantially high degree of purity. As a result we are able to collect these melamine crystals and obtain melamine in an unusually pure form. This is an unexpected advantage of our invention and a valuable part thereof. The unsublimed melamine can be recovered from the residue in the autoclave by recrystallization from water.

As shown by the general reaction equations given above, carbon dioxide is evolved during the process. Naturally, the formation of this gas tends to create a pressure in the reaction vessel when it is sealed. The amount of this autogeneously developed pressure depends on the temperature at which the conversion is carried out and the free space in the autoclave. Although it appears that better yields are obtained under pressure, the pressure factor is not particularly critical. We prefer to carry out the conversion under the autogeneously developed pressure of the reaction but we may operate our process under any pressure up to about 3000 lbs. per sq. inch or more. Apparently it is merely necessary that the hydroxytriazine be in an atmosphere of ammonia at the temperature of the process in order that the synthesis of melamine therefrom be successfully achieved.

This is a continuation-in-part of our application Serial No. 495,216, filed July 17, 1943.

We claim:

1. A method of preparing melamine which comprises heating cyanuric acid in the presence of ammonia under the autogeneously developed pressure of the reaction at temperatures of at least 300° C. under substantially anhydrous conditions until a substantial amount of the cyanuric acid has been converted to melamine and thereafter recovering the melamine.

2. A method of preparing melamine which comprises heating ammelide in the presence of ammonia under the autogeneously developed pressure of the reaction at temperatures of at least 300° C. under substantially anhydrous conditions until a substantial amount of the ammelide has been converted to melamine and thereafter recovering the melamine.

3. A method of preparing melamine which comprises heating ammeline in the presence of ammonia under the autogeneously developed pressure of the reaction at temperatures of a least 300° C. under substantially anhydrous conditions until a substantial amount of the ammeline has been converted to melamine and thereafter recovering the melamine.

4. A method of preparing melamine which comprises heating a hydroxytriazine in the presence of ammonia at pressures at least those of the autogeneously developed pressure of the reaction and at temperatures within the range 350° C. to 450° C. under substantially anhydrous conditions until a substantial amount of the hydroxy-triazine has been converted to melamine and thereafter recovering the melamine.

5. A method of preparing melamine which comprises heating a hydroxy-triazine in the presence of ammonia at temperatures of at least 300° C. under the autogeneously developed pressure of the reaction and under substantially anhydrous conditions until a substantial amount of the hydroxytriazine has been converted to melamine and thereafter recovering the melamine.

JOHNSTONE S. MACKAY.
JOSEPH H. PADEN.

REFERENCES CITED

The following references are of record in the file of this patent:

UNITED STATES PATENTS

| Number | Name | Date |
|---|---|---|
| 2,087,980 | Lawrence | July 27, 1937 |
| 2,101,807 | Corey | Dec. 7, 1937 |
| 2,142,965 | Hale | Jan. 3, 1939 |

FOREIGN PATENTS

| Number | Country | Date |
|---|---|---|
| 337,394 | Great Britain | 1930 |
| 523,448 | Great Britain | 1940 |

Certificate of Correction

Patent No. 2,566,230                                                  August 28, 1951

JOHNSTONE S. MACKAY ET AL.

It is hereby certified that error appears in the printed specification of the above numbered patent requiring correction as follows:

Column 4, Tables I, II, and III, lines 3, under the headings "Hydroxy-triazine" for "Do" read *Ammeline*; same column, Table III, line 3, under the heading "Melamine Formation, Per Cent of Theoretical" for "38.5" read *83.5*; and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*